No. 692,565. Patented Feb. 4, 1902.
P. J. WEDER.
VETERINARY MOUTH SPECULUM.
(Application filed Oct. 24, 1901.)
(No Model.)
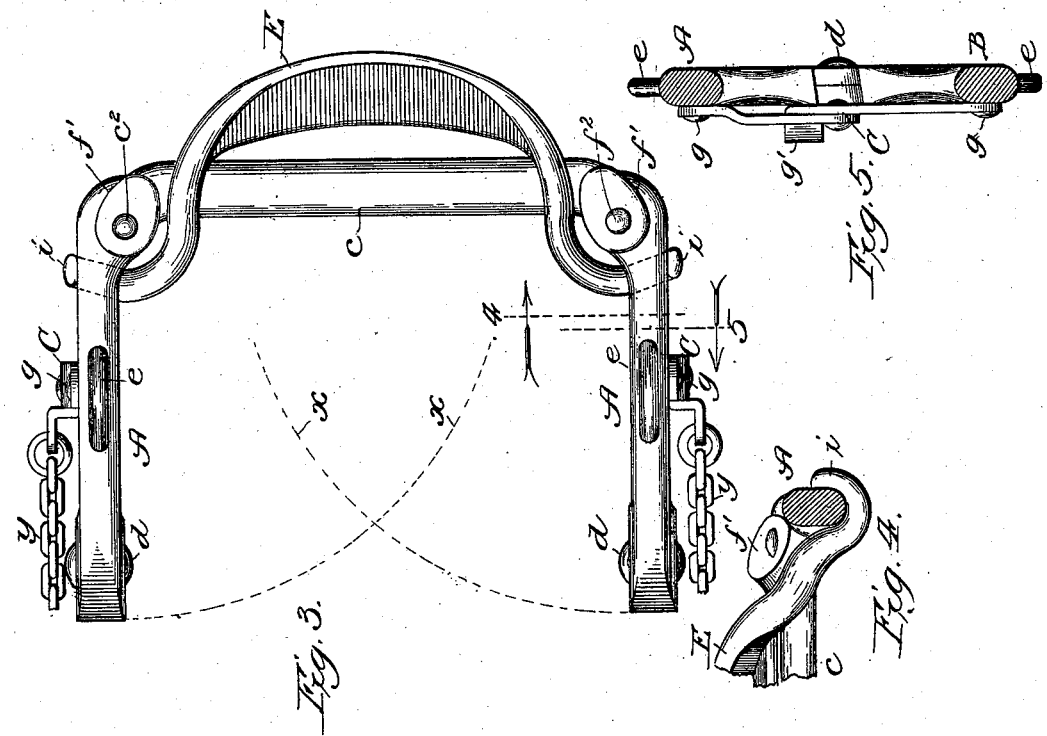
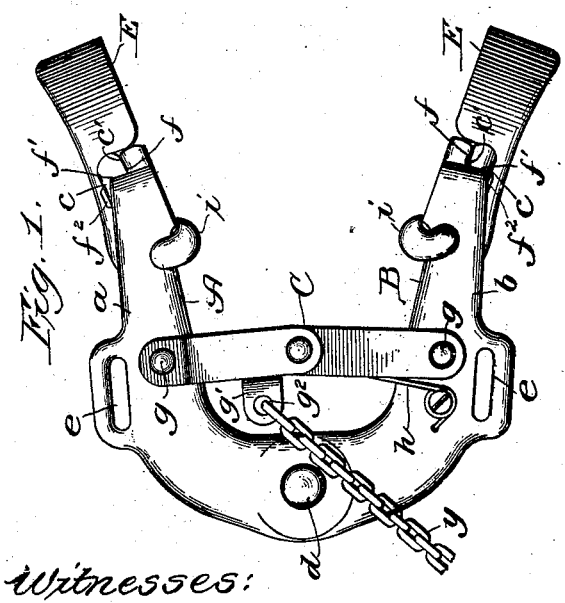
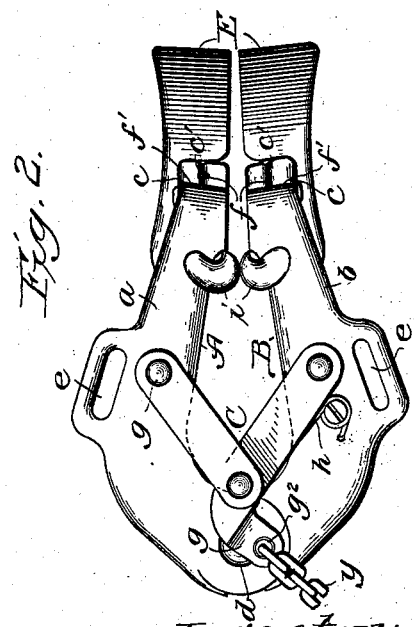
Witnesses:
John Enders Jr.
Geo. C. Davison.
Inventor:
Paul J. Weder.
By Dyrenforth, Dyrenforth & Lee,
Att'ys.

UNITED STATES PATENT OFFICE.

PAUL J. WEDER, OF CHICAGO, ILLINOIS, ASSIGNOR TO SHARP & SMITH, OF CHICAGO, ILLINOIS, A FIRM.

VETERINARY MOUTH-SPECULUM.

SPECIFICATION forming part of Letters Patent No. 692,565, dated February 4, 1902.

Application filed October 24, 1901. Serial No. 79,791. (No model.)

*To all whom it may concern:*

Be it known that I, PAUL J. WEDER, a citizen of the United States, residing at Chicago, in the county of Cook and State of Illinois, have invented a new and useful Improvement in Veterinary Mouth-Speculums, of which the following is a specification.

My object is to provide an implement of improved construction which is adapted to be readily and quickly applied to hold open the mouth of the animal and quickly removed and which when in place will hold the mouth open with great security without danger of opening it too far and without obstructing the mouth either at the front or sides.

My object is, further, to provide a mouth-speculum possessing the above advantages and of a particularly simple, strong, and inexpensive construction which may be folded into comparatively small portable shape when not in use.

In the drawings, Figure 1 is a side view of my improved device carrying tooth-plates and with the jaws distended; Fig. 2, a similar view showing the jaws closed; Fig. 3, a plan view of the device, and Figs. 4 and 5 enlarged sections taken on lines 4 and 5 in Fig. 3 and viewed as indicated by the arrows.

A and B are respectively the upper and lower pivotal jaws of the device, consisting of the side bars $a$ $b$ and bit-bars $c$. The side bars $a$ $b$ are of the curved shapes shown, pivotally secured together at their rear ends, the pivotal connections being in the form of rule-joints $d$, as indicated. On the side bars are loops $e$ for attachment to a suitable headstall. (Not shown.) On the ends of the bars $a$ $b$, at their inner sides, are flat bearing-surfaces $f$ and shoulders $f'$. The bit-bars $c$ are formed at their ends with flat bearing-surfaces $c'$ and fit into the sockets formed by the shoulders $f'$. On the parts $f$ are pins $f^2$, passing through perforations $c^2$ near the ends of the bit-bars. The connections at $f c'$ between the side bars and bit-bars are like rule-joints, permitting the sides of the jaws to be swung inward, as indicated by the dotted lines $x$ in Fig. 3, when the jaws are closed, but preventing their being opened or moved apart farther than shown in Fig. 3. The abutting surfaces $f c'$ of the upper jaw are parallel with the same surfaces of the lower jaw when the jaws are closed, as shown in Fig. 2, permitting the side bars to be swung to folded position; but the same jointed surfaces of the upper and lower jaws extend at an angle to each other when the jaws are opened, as shown in Fig. 1, thereby preventing the side bars from moving from the position shown in Fig. 3. Thus it will be understood that when the jaws are closed the device may be folded by swinging the side bars in the direction of each other on the pivots $f^2$; but when the jaws are open the side bars are locked against lateral movement. On opposite sides of the jaws, near the back, are toggles C, pivotally secured at their outer ends upon pins $g$. On the end of one of the toggle-levers of each pair is a projection $g'$, forming a shoulder, to limit the movement of the toggle. The end $g'$ is also provided with a perforation $g^2$ to receive the end of a tug-cord or chain Y, which is secured thereto. On the jaw-bars $b$ are springs $h$, which bear against the lower toggle levers or sections and tend to maintain the toggles extended when the jaws are open.

To apply the speculum to the mouth of an animal, the side frames are swung on the pivots $f^2$ to the positions shown in Fig. 3, and while the jaws are closed, as shown in Fig. 2, the bit-bars are passed into the mouth until they rest behind the animal's teeth. The device is secured by the headstall. (Not shown.) The animal's mouth is then opened, and the jaws of the device are opened at the same time to the position shown in Fig. 1, in which position it will be held by the toggles C. As shown in Fig. 1, the toggle members on each side of the device move slightly past a straight line or dead-center, when the stop or shoulder $g'$ contacts with the other toggle member and locks them against closing under pressure upon their ends. The spring $h$ tends to hold the toggle members in locking position, and the rule-joint connections at $d$ tend to prevent opening of the jaws materially beyond the position in which they are locked by the toggles. A mere tug upon the chain Y will permit the jaws to close.

In certain operations, as upon the teeth of the animal, only the bit-bars are necessary to hold the mouth open and leave the teeth free.

In giving medicine, however, or operations upon the throat the removable tooth-plates E may be used. These tooth-plates hook at their ends $i$ over the inner edges of the jaw-bars $a\,b$ and rest against the outer surfaces of the bit-bars, as clearly shown in the drawings.

While I prefer to construct my improved veterinary mouth-speculum throughout as shown, it is obvious that it may be changed in the matter of details without departing from the spirit of my invention as set forth in the claims.

What I claim as new, and desire to secure by Letters Patent, is—

1. In a veterinary mouth-speculum, the combination of jaws formed with upper and lower side bars pivoted together, and means for locking the jaws against closing when opened, comprising a toggle fulcrumed at its opposite ends to the said upper and lower side bars and having its members pivotally connected together between said bars, substantially as set forth.

2. In a veterinary mouth-speculum, the combination of jaws formed with upper and lower side bars pivoted together, a toggle fulcrumed at its opposite ends to the said upper and lower side bars and having its members pivotally connected together between said bars, and a stop in the path of one of the toggle members limiting its movement beyond the dead-center at one side to lock the jaws against closing when opened, substantially as set forth.

3. In a veterinary mouth-speculum, the combination of jaws formed with upper and lower side bars pivoted together, a toggle fulcrumed at its opposite ends to the said upper and lower side bars and having its members pivotally connected together between said bars, a stop in the path of one of the toggle members limiting its movement beyond the dead-center at one side to lock the jaws against closing when opened, and a spring operating normally to hold said member against said stop, substantially as set forth.

4. In a veterinary mouth-speculum, the combination of jaws formed with upper and lower side bars pivoted together, a toggle fulcrumed at its opposite ends to the said upper and lower side bars and having its members pivotally connected together between said bars, a stop in the path of one of the toggle members limiting its movement beyond the dead-center at one side to lock the jaws against closing when opened, and a flexible tug connected with one of the toggle members, substantially as and for the purpose set forth.

5. In a veterinary mouth-speculum, the combination of jaws formed with upper and lower side bars, rule-joint connections between the side bars limiting the opening movement of the jaws, a toggle fulcrumed at its opposite ends to the said upper and lower side bars and having its members pivotally connected between said bars, and a stop in the path of one of the toggle members limiting its movement beyond the dead-center at one side to lock the jaws against closing when opened.

6. In a veterinary mouth-speculum, the combination of jaws formed with upper and lower side bars pivoted together, bit-bars pivotally connected with the free ends of the said side bars, toggle-lever locking means for holding the jaws against closing when opened, and removable tooth-plates provided with hooked ends to engage the said side bars and resting between their ends against the said bit-bars, substantially as and for the purpose set forth.

PAUL J. WEDER.

In presence of—
ALBERT D. BACCI,
M. S. MACKENZIE.